United States Patent
Trachewsky (10) Patent No.: US 9,136,916 B2
(45) Date of Patent: Sep. 15, 2015

(54) ROBUST WIRELESS COMMUNICATION SYSTEM AND COMPONENTS THEREOF FOR PROCESSING A MESSAGE FROM TWO SOURCES

(75) Inventor: Jason A. Trachewsky, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1532 days.

(21) Appl. No.: 12/098,013

(22) Filed: Apr. 4, 2008

(65) Prior Publication Data

US 2009/0252085 A1    Oct. 8, 2009

(51) Int. Cl.
*H04B 7/02* (2006.01)
*H04L 1/06* (2006.01)
*H04L 29/06* (2006.01)
*H04L 1/00* (2006.01)

(52) U.S. Cl.
CPC ............... *H04B 7/022* (2013.01); *H04B 7/026* (2013.01); *H04L 1/06* (2013.01); *H04L 29/0653* (2013.01); *H04L 2001/0097* (2013.01)

(58) Field of Classification Search
None
See application file for complete search history.

(56) References Cited

U.S. PATENT DOCUMENTS

| | | | | |
|---|---|---|---|---|
| 5,737,328 | A * | 4/1998 | Norman et al. | 370/331 |
| 6,625,236 | B1 * | 9/2003 | Dent et al. | 375/341 |
| 6,850,740 | B1 * | 2/2005 | Haartsen | 455/101 |
| 2003/0012163 | A1 * | 1/2003 | Cafarelli et al. | 370/338 |
| 2003/0050098 | A1 * | 3/2003 | D'Agati et al. | 455/561 |
| 2003/0086415 | A1 * | 5/2003 | Bernhard et al. | 370/352 |
| 2006/0286946 | A1 * | 12/2006 | Akkarakaran et al. | 455/101 |
| 2007/0070954 | A1 * | 3/2007 | Kim et al. | 370/334 |
| 2007/0071150 | A1 * | 3/2007 | Yang et al. | 375/347 |
| 2008/0207214 | A1 * | 8/2008 | Han et al. | 455/450 |

* cited by examiner

*Primary Examiner* — Khoa Huynh
(74) *Attorney, Agent, or Firm* — Garlick & Markison; Edward J. Marshall (57) ABSTRACT

A wireless communication system includes an access point and first and second stations. The first station transmits a first message that includes an address of a second station as a destination address and an address of the first station as a source address. The access point forwards the message including the address of the second station address as the destination address and the address of the first station as the source address. The second station receives the message from the first station during a first time interval and receives the first message from the access point during a second time interval. The second station processes the duplicate received message to produce inbound data.

20 Claims, 5 Drawing Sheets

FIG. 8

ROBUST WIRELESS COMMUNICATION SYSTEM AND COMPONENTS THEREOF FOR PROCESSING A MESSAGE FROM TWO SOURCES

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to improved communications within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In general, for direct or indirect wireless communications, a wireless device communicates with one other device at a time (e.g., another wireless device for a direct communication and an access point or base station for an indirect communication). For an indirect communication, a wireless communication device is registered with a single access point or a single base station even though it may be in range of multiple access points or base stations. As such, when a communication is active, the wireless communication device communicates with its access point or base station. Thus, the communication is susceptible to the various factors (e.g., interferers, multi-path fading, etc.) that adversely affect the communication.

Therefore, a need exists for a method and apparatus of improving communications within a wireless communication system.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
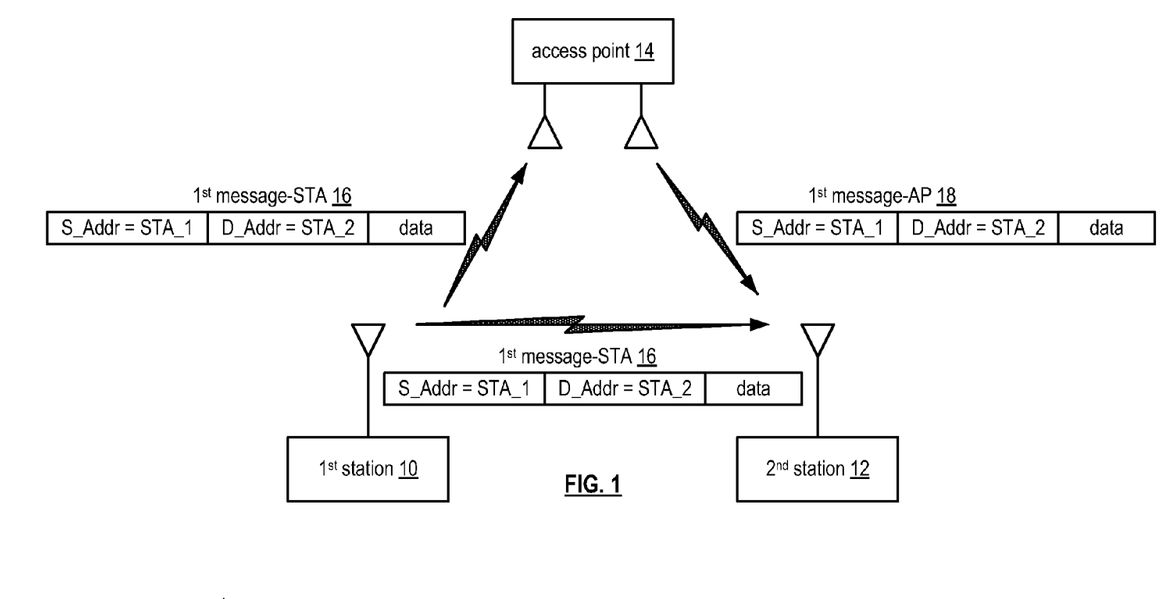
FIG. 1 is a schematic block diagram of an embodiment of a communication system in accordance with the present invention.

FIG. 1 is a schematic block diagram of an embodiment of a communication system that may be a wireless local area network (WLAN), a cellular communication system or any other type of wireless communication system. The system includes a plurality of stations 10 and 12 and at least one access point 14. A station 10 or 12 may be a radio frequency (RF) transceiver coupled to, or included in, a computer, a personal digital assistance, a printer, etc. Alternatively, or in addition to, the station 10 or 12 may be a cellular telephone, networked walkie-talkie, etc, where the access point 14 may be referred to as a base station.

In operation, the first station 10 transmits a first message 16 during a first time interval. The first message 16 includes a source address field, a destination address field, and a data field. In this example, the first station 10 is targeting the second station 12 as the destination of the message 16. As such, the source address field includes the address of the first station 10, the destination address field includes the address of the second station 12, and the data field includes the content, or a portion thereof, of a message. The message 16 is received by the access point 14 and the second station 12.

The access point 14 receives the message 16 during the first time interval and, during a second time interval, forwards the message 18 to the second station. The AP forward message 18 includes a source address field, a destination address field, and a data field. The source field includes the address of the first station instead of the address of the access point 14, the destination field includes the address of the second station 12, and the data field includes the content, or a portion thereof, of a message.

The second station 12 receives the first message 16 from the first station during the first time interval and processes it to produce a first processed signal. The processing includes identifying that the message is being received from a station and not from an access point. Thus, the second station 12 waits to receive the message from an access point during a second time interval. When the second station 12 receives the forwarded message 18 from the access point, it processes the forwarded message 18 to produce a second processed signal. The second station 12 combines the first and second processed signals to produce a combined signal and converts the combined signal into inbound data. In this manner, the second station 12 has a more robust signal to process, which improves the second station's ability to recapture the inbound data.

Figure 2:
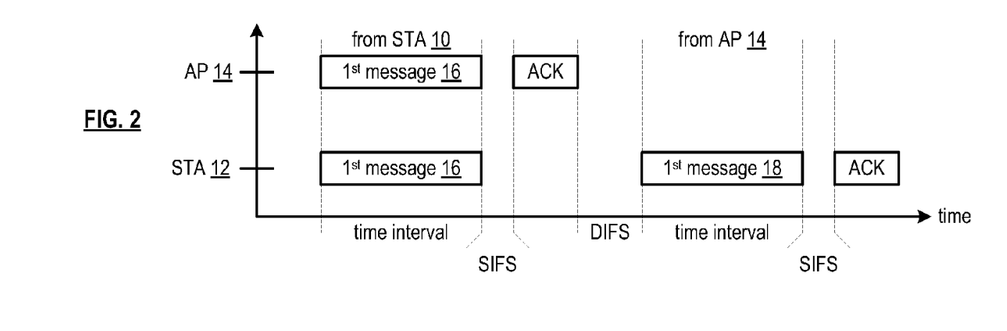
FIG. 2 is a diagram of an example of a communication in accordance with the present invention.

FIG. 2 is a diagram of an example of the communication discussed with reference to FIG. 1. In this diagram, the first station 10 transmits the first message 16 during a first time interval, which is received by the access point 14 and the second station 12. After a short interframe space (SIFS), the access point 14 transmits an acknowledgment signal back to the first station 10. The second station 12 does not generate an acknowledgement signal in the present example, but could provide an acknowledgement signal instead of, or in addition to, the access point 14 providing one.

After a distributed interframe spacing (DIFS), the access point 14 transmits the forwarded message 18 to the second station 12. After an SIFS interval, the second station 12 provides an acknowledgement signal to the access point 14.

Figure 3:
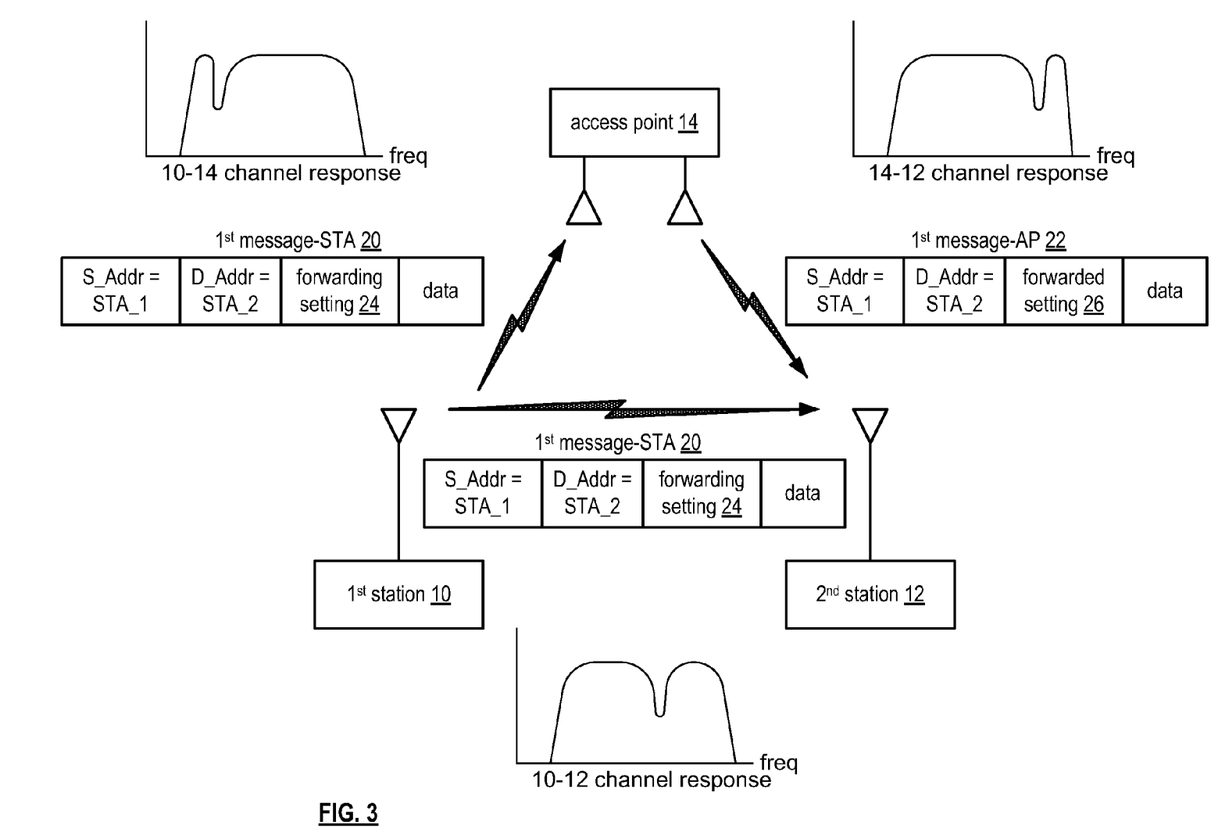
FIG. 3 is a schematic block diagram of another embodiment of a communication system in accordance with the present invention.

FIG. 3 is a schematic block diagram of an embodiment of a communication system that may be a wireless local area network (WLAN), a cellular communication system or any other type of wireless communication system. The system includes a plurality of stations 10 and 12 and at least one access point 14. A station 10 or 12 may be a radio frequency (RF) transceiver coupled to, or included in, a computer, a personal digital assistance, a printer, etc. Alternatively, or in addition to, the station 10 or 12 may be a cellular telephone, networked walkie-talkie, etc, where the access point 14 may be referred to as a base station.

In operation, the first station 10 transmits a first message 20 during a first time interval. The first message 20 includes a source address field, a destination address field, a forward setting field 24, and a data field. In this example, the first station 10 is targeting the second station 12 as the destination of the message 20. As such, the source address field includes the address of the first station 10, the destination address field includes the address of the second station 12, and the data field includes the content, or a portion thereof, of a message. The forwarding setting 24 indicates to the access point 14 that it is to forward the message 20 to the second station 12, but to identify the first station 10 as the source of the message. In a WLAN, the forwarding setting 24 may correspond to an address field setting of To DS=1 and From DS=0, where DS means distribution system.

The access point 14 receives the message 20 during the first time interval and, during a second time interval, forwards the message 22 to the second station. The AP forward message 22 includes a source address field, a destination address field, a forwarded setting 26, and a data field. The source field includes the address of the first station instead of the address of the access point 14, the destination field includes the address of the second station 12, and the data field includes the content, or a portion thereof, of a message. The forwarded setting 26 indicates that the access point is forwarding the message on behalf of the first station 10. In a WLAN, the forwarded setting 26 may correspond to an address field setting of To DS=0 and From DS=1.

The second station 12 receives the first message 20 from the first station during the first time interval and processes it to produce a first processed signal. The processing includes interpreting the forwarding setting 24 to determine that it will be receiving a forwarded message 22 in a subsequent time interval. When the second station 12 receives the forwarded message 22 from the access point, it processes the forwarded message 22 to produce a second processed signal. The second station 12 combines the first and second processed signals to produce a combined signal and converts the combined signal into inbound data.

FIG. 3 further illustrates example channel responses between the first station 10 and the access point 14, between the first and second stations, and between the access point 14 and the second station 12. In this example, each channel response has a notch, where the signal strength of a received signal is weaker than at other frequencies of the channel. In the embodiments of FIGS. 1-3, the weak signal strength notches of the individual channels have minimal affect on recapturing the data because of combining the signals received from two sources. Thus, the communication systems of FIGS. 1 and 3 are more robust.

Figure 4:
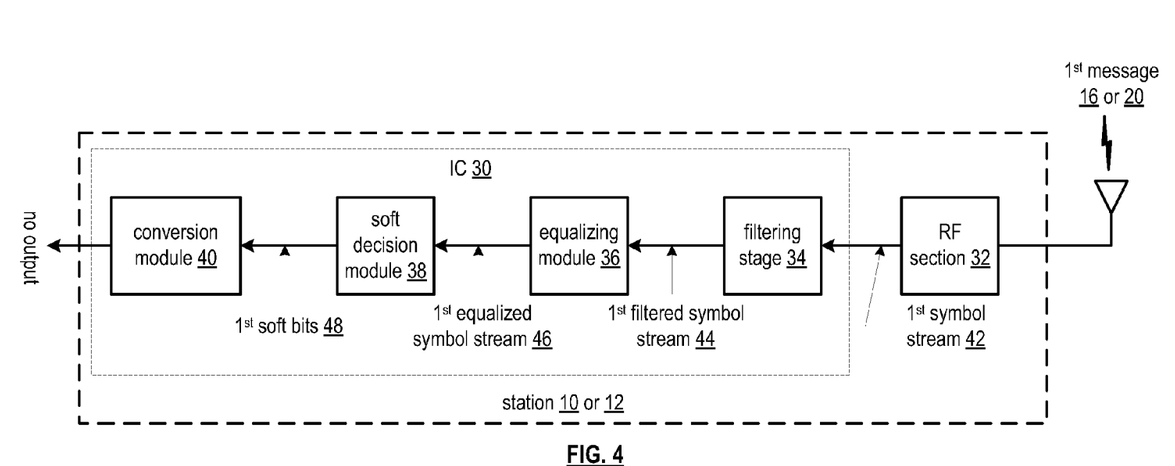
FIG. 4 is a schematic block diagram of an embodiment of a station processing a first message from a first source in accordance with the present invention.

FIG. 4 is a schematic block diagram of an embodiment of a station 10 or 12 processing a first message 16 or 20 from a first source (e.g., station 12 or 10). The station 10 or 12 includes a radio frequency section 32, a filtering station 34, an equalizing module 36, a soft decision module 38, and a conversion module 40. In an embodiment, modules 34-40 may be implemented on a single integrated circuit (IC) 30. In another embodiment, the IC 30 may further include the RF section 32 with modules 34-40.

As shown, the RF section 32 is receiving the first message 16 or 20 from another source (e.g., another station). The RF section 32, which may include an antenna interface and a down conversion module, converts the first message into a first symbol stream 42 in accordance with one or more wireless communication protocols (e.g., IEEE 802.11, Bluetooth, GSM, CDMA, WCDMA, GPRS, EDGE, HSPDA, etc.). Note that the antenna interface may include an impedance matching circuit, a transmission line, and/or a transformer balun and the down conversion module may include one or more mixers and one or more filters.

The filtering stage 34, which includes one or more low pass filters and/or one or more bandpass filters (e.g., one for an in-phase signal and another for a quadrature signal), filters the first symbol stream 42 to produce a first filtered symbol stream 44. The equalizing module 36 performs a first channel equalization on the first filtered symbol stream 44 to produce a first equalized symbol stream 46. Note that the filtering of the filtering stage 34 and the channel equalization of the equalizing module 36 may be done in the analog domain and/or the digital domain.

The soft decision module 38 (embodiments of which will be described in greater detail with reference to FIGS. 6 and 7) computes first soft bits 48 from the first equalized symbol stream 46. The first soft bits 48 are stored for subsequent use by the conversion module 40. At this point in the processing, the conversion module 40 does not generate an output.

Figure 5:
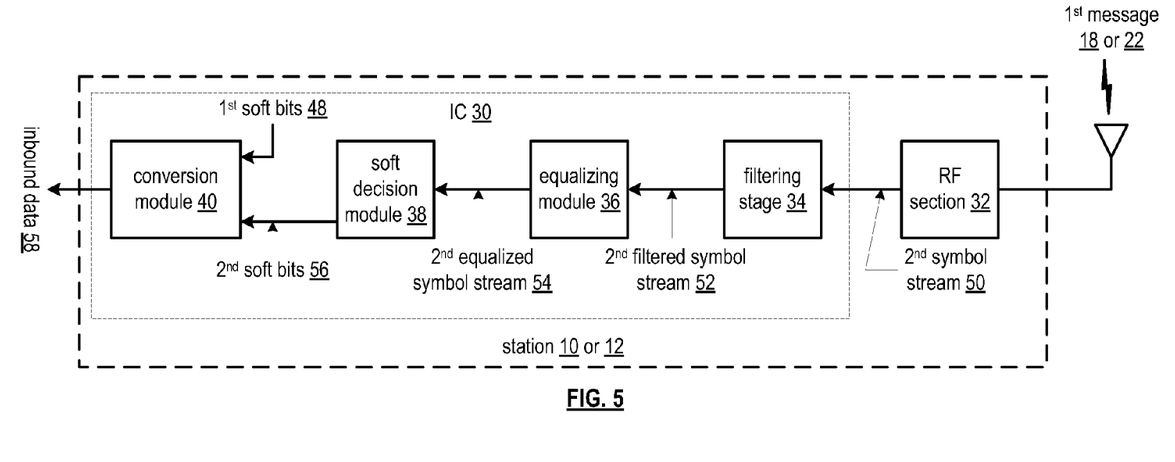
FIG. 5 is a schematic block diagram of an embodiment of a station processing the first message from a second source in accordance with the present invention.

FIG. 5 is a schematic block diagram of an embodiment of a station 10 or 12 processing a first message 18 or 22 from a second source (e.g., access point 14). The station 10 or 12 includes the RF section 32, the filtering station 34, the equalizing module 36, the soft decision module 38, and the conversion module 40.

As shown, the RF section 32 is receiving the first message 18 or 22 from another source (e.g., the access point 14). The RF section 32 converts the first message into a second symbol stream 50 in accordance with one or more wireless communication protocols.

The filtering stage 34 filters the second symbol stream 50 to produce a second filtered symbol stream 52. The equalizing module 36 performs a second channel equalization on the second filtered symbol stream 52 to produce a second equalized symbol stream 54. Note that the first channel equalization corresponds to compensating the channel response between the stations and the second channel equalization corresponds to compensating the channel response between the access point and the station.

The soft decision module 38 computes second soft bits 56 from the second equalized symbol stream 54. The conversion module 40 (embodiments of which will be described with reference to FIGS. 6 and 7) converts the first and second soft bits 48 and 56 into the inbound data 58.

Figure 6:
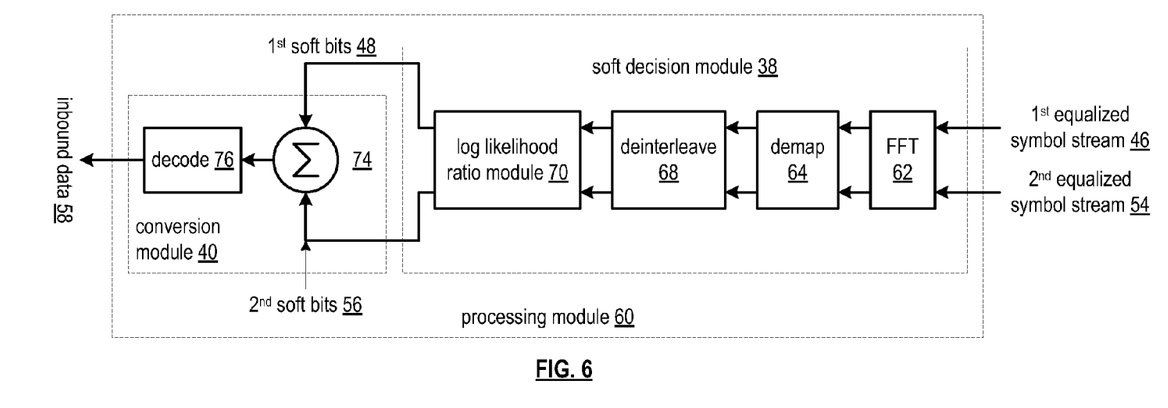
FIG. 6 is a schematic block diagram of an embodiment of a processing module in accordance with the present invention.

FIG. 6 is a schematic block diagram of an embodiment of a processing module 60 that provides the soft decision module 38 and the conversion module 40. In an embodiment, the processing module 60 may further provide a digital equalizing module 36 and a digital filtering module 34. The processing module 60 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 60 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 60 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 60 executes, hard coded and/or operational instructions corresponding to at least some of the steps and/or functions illustrated in FIGS. 1-8.

The soft decision module 38 includes a fast Fourier transform (FFT) module 62, a demapping module 64, a deinterleaving module 68, and a log likelihood ratio module 70. The conversion module 70 includes a summing module 74 and a decoding module 76. Note that within the soft decision module 38 the processing of the first and second equalized symbol streams 46 and 54 are shown as separate paths, which is done for illustrative purposes. In an embodiment, since the first and second equalized symbol streams 46 and 54 are received at different times, they are processed in the same manner via the same path.

The FFT module 62 converts the first and second equalized symbol streams 46 and 54 into first and second frequency domain symbol streams, respectively. The demapping module 64 demaps the first and second frequency domain symbol streams in accordance with a constellation code into first and second digital signal streams, respectively. The deinterleaving module 68 deinterleaves the first and second digital signal streams into first and second deinterleaved digital signal streams, respectively.

The log likelihood ratio module 70 performs a log likelihood ratio on the first deinterleaved digital signal stream to produce the first soft bits 48 and performs a log likelihood ratio on the second deinterleaved digital signal stream to produce the second soft bits 56. In general, the log likelihood ratio generates, for each bit in the digital signal stream, a value ranging from 0.0 to 1.0. The closer the value is to 0.0 the more likely the bit is a zero and the closer the value is to 1.0 the more likely the bit is a one.

The summing module 74 sums the first and second soft bits to produce the combined signal. The summing may be an addition function, an averaging function, a weighted summing, a weighted averaging, or a combination thereof. For example, if the first soft bits 48 has a value of 0.4 for a bit and the second soft bits has a value of 0.9 for the same bit, the second soft bit value will be given more weight since it is closer to a 1 that the 0.4 is to a one or a zero. The decoding module 76, which may be a Viterbi decoder, decodes the combined signal to produce the inbound data 58.

Figure 7:
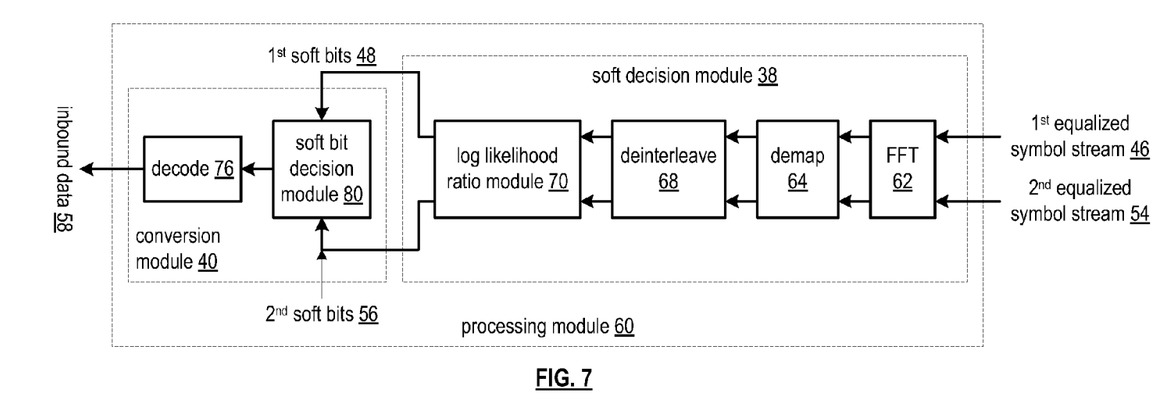
FIG. 7 is a schematic block diagram of another embodiment of a processing module in accordance with the present invention.

FIG. 7 is a schematic block diagram of another embodiment of a processing module 60 that provides the soft decision module 38 and the conversion module 40. The soft decision module 38 includes the fast Fourier transform (FFT) module 62, the demapping module 64, the deinterleaving module 68, and the log likelihood ratio module 70. The soft decision module 38 functions as previously discussed with reference to FIG. 6.

The conversion module 70 includes a soft bit decision module 80 and a decoding module 76. The soft bit decision module 80 selects most likely bits from the first and second soft bits 48 and 56 to produce the combined signal. For example, if the first soft bits 48 has a value of 0.4 for a bit and the second soft bits has a value of 0.9 for the same bit, the soft bit decision module 80 selects the second soft bit value since it is closer to a 1 that the 0.4 is to a one or a zero. The soft bit decision module 80 does the same type of decision making for each bit of the first and second soft bits 48 and 56. The decoding module 76 decodes the combined signal to produce the inbound data 58.

Figure 8:
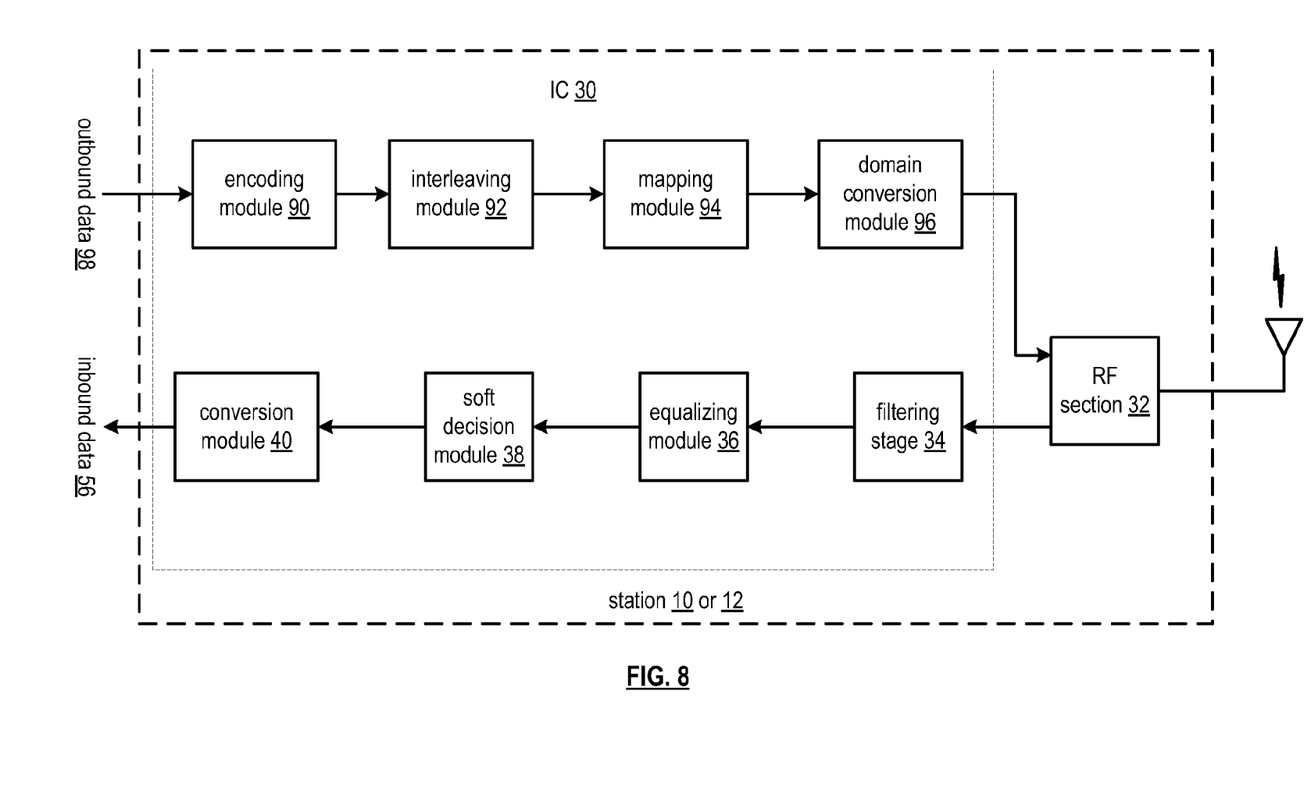
FIG. 8 is a schematic block diagram of an embodiment of a station in accordance with the present invention.

FIG. 8 is a schematic block diagram of an embodiment of a station 10 or 12 processing a first message 16 or 20 from a first source (e.g., station 12 or 10). The station 10 or 12 includes a radio frequency section 32, a filtering station 34, an equalizing module 36, a soft decision module 38, a conversion module 40, an encoding module 90, an interleaving module 92, a mapping module 94, and a domain conversion module 96 (e.g., inverse FFT). In an embodiment, modules 34-40 and 90-96 may be implemented on a single integrated circuit (IC) 30. In another embodiment, the IC 30 may further include the RF section 32 with modules 34-40 and 90-96. The functionality of modules 34-40 function as previously discussed with reference to FIGS. 4 and 5.

The encoding module 90 encodes outbound data 98 (e.g., the content of the first message) to produce encoded data. The outbound data includes a source address field, a destination address field, and a data field. The outbound data may further include a forward setting field. The interleaving module 92 interleaves the encoded data to produce interleaved data. The mapping module 94 maps the interleaved data to a constellation pattern to produce mapped data. The domain conversion module 96 converts the mapped data into an outbound symbol stream. The RF section 32 converts the symbol stream into an outbound RF signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A device operable in a wireless communication system comprises:
   a second wireless station operable to register with an access point, wherein the second wireless station is operable to:
      receive a first message from a first wireless station registered with the access point during a first time interval, wherein the first message includes an address of the second wireless station as a destination address, an address of the first wireless station as a source address, and a forward setting field that indicates forwarding of the first message by the access point to the second wireless station;
      interpret the forward setting field in the first message that indicates the first message is to be forwarded by the access point to the second wireless station;
      wait for a predetermined time period to receive a forwarded first message from the access point;
      receive the forwarded first message from the access point during a second time interval;
      convert the first message received from the first wireless station into a first symbol stream;
      convert the forwarded first message received from the access point into a second symbol stream;
      filter the first symbol stream to produce a first filtered symbol stream;
      filter the second symbol stream to produce a second filtered symbol stream;

perform a first channel equalization on the first filtered symbol stream to produce a first equalized symbol stream;
perform a second channel equalization on the second filtered symbol stream to produce a second equalized symbol stream;
compute first soft bits from the first equalized symbol stream;
compute second soft bits from the second equalized symbol stream; and
convert the first and second soft bits into inbound data.

2. The device of claim 1, wherein the forward setting field indicates that the access point is to forward the first message with the address of the first wireless station as the source address.

3. The device of claim 1, wherein the access point forwards the first message with the address of the first wireless station as the source address after a predetermined interframe spacing interval.

4. The device of claim 1, wherein the second wireless station comprises:
a radio frequency section operable to:
convert the first message received from the first wireless station into the first symbol stream; and
convert the first message received from the access point into the second symbol stream;
a filtering stage operable to:
filter the first symbol stream to produce the first filtered symbol stream; and
filter the second symbol stream to produce the second filtered symbol stream;
an equalizing circuitry operable to:
perform the first channel equalization on the first filtered symbol stream to produce the first equalized symbol stream; and
perform the second channel equalization on the second filtered symbol stream to produce the second equalized symbol stream;
a soft decision circuitry operable to:
compute the first soft bits from the first equalized symbol stream; and
compute the second soft bits from the second equalized symbol stream; and
a conversion circuitry operable to convert the first and second soft bits into the inbound data.

5. The device of claim 4, wherein the conversion circuitry comprises:
a summing circuitry coupled to sum the first and second soft bits to produce a combined signal; and
a decoding circuitry coupled to decode the combined signal to produce the inbound data.

6. The device of claim 4, wherein the conversion circuitry comprises:
a soft bit decision circuitry coupled to select most likely bits from the first and second soft bits to produce a combined signal; and
a decoding circuitry coupled to decode the combined signal to produce the inbound data.

7. A station comprises:
at least one processing circuitry operable to:
detect a first message with a source address of another station during a first time interval, wherein the first message includes an access point forwarding setting that requests forwarding of the first message by an access point;
in response to a forward setting field, wait for forwarding of the first message by the access point;
receive a second message during a second time interval;
determine that the second message includes the first message forwarded by the access point, wherein the second message includes the source address of the another station;
convert the first message received from the another station into a first symbol stream;
convert the second message received from the access point into a second symbol stream;
filter the first symbol stream to produce a first filtered symbol stream;
filter the second symbol stream to produce a second filtered symbol stream;
perform a first channel equalization on the first filtered symbol stream to produce a first equalized symbol stream;
perform a second channel equalization on the second filtered symbol stream to produce a second equalized symbol stream;
compute first soft bits from the first equalized symbol stream;
compute second soft bits from the second equalized symbol stream; and
convert the first and second soft bits into inbound data.

8. The station of claim 7, wherein the at least one processing circuitry comprises:
a radio frequency (RF) section operable to:
convert the first message into the first symbol stream; and
convert the second message into the second symbol stream;
a filtering stage operable to:
filter the first symbol stream to produce the first filtered symbol stream; and
filter the second symbol stream to produce the second filtered symbol stream;
an equalizing circuitry operable to:
perform the first channel equalization on the first filtered symbol stream to produce the first equalized symbol stream; and
perform the second channel equalization on the second filtered symbol stream to produce the second equalized symbol stream;
a soft decision circuitry operable to:
compute the first soft bits from the first equalized symbol stream; and
compute the second soft bits from the second equalized symbol stream;
a conversion circuitry operable to convert the first and second soft bits into the inbound data, wherein the conversion circuitry comprises:
a summing circuitry coupled to sum the first and second soft bits to produce a combined signal; and
a decoding circuitry coupled to decode the combined signal to produce the inbound data.

9. The station of claim 8, wherein the conversion module comprises:
a soft bit decision circuitry coupled to select most likely bits from the first and second soft bits to produce a combined signal; and
a decoding circuitry coupled to decode the combined signal to produce the inbound data.

10. The station of claim 8 further comprises:
an encoding circuitry coupled to encode outbound data to produce encoded data, wherein the outbound data includes an address of the station as a source address and an address of a second station as a destination address;

an interleaving circuitry coupled to interleave the encoded data to produce interleaved data;

a mapping circuitry coupled to map the interleaved data to a constellation pattern to produce mapped data; and a domain conversion circuitry coupled to convert the mapped data into an outbound symbol stream, wherein the RF section converts the symbol stream into an outbound RF signal.

11. The station of claim 10, wherein the encoding circuitry further functions to:

encode the outbound data to produce the encoded data, wherein the outbound data further includes the access point forwarding setting that requests the access point to forward the outbound RF signal with the address of the station as the source address.

12. A first wireless station comprises:

a processing circuitry operable to:
detect a first message with a source address of a second wireless station during a first time interval, wherein the first message includes a forward setting field that requests forwarding of the first message by an access point;
in response to the forward setting field, wait for a period corresponding to inter-frame spacing;
receive a second message during a second time interval;
determine that the second message includes the first message forwarded by an access point, wherein the second message includes the source address of the second wireless station;

a filtering stage circuitry operable to:
filter a first symbol stream from the first message to produce a first filtered symbol stream; and
filter a second symbol stream from the second message to produce a second filtered symbol stream;

an equalizing circuitry operable to:
perform a first channel equalization on the first filtered symbol stream to produce a first equalized symbol stream; and
perform a second channel equalization on the second filtered symbol stream to produce a second equalized symbol stream;

a soft decision circuitry operable to:
compute first soft bits from the first equalized symbol stream; and
compute second soft bits from the second equalized symbol stream; and a conversion circuitry operable to convert the first and second soft bits into inbound data.

13. The first wireless station of claim 12, wherein the conversion circuitry comprises:

a summing circuitry operable to sum the first and second soft bits to produce a combined signal; and a decoding circuitry operable to decode the combined signal to produce the inbound data.

14. The first wireless station of claim 12, wherein the conversion circuitry comprises:

a soft bit decision circuitry operable to select most likely bits from the first and second soft bits to produce a combined signal; and a decoding circuitry operable to decode the combined signal to produce the inbound data.

15. The first wireless station of claim 12 further comprises:

a radio frequency (RF) section operable to:
convert the first message received from the second wireless station into the first symbol stream; and
convert the second message received from the access point into the second symbol stream.

16. The first wireless station of claim 15 further comprises:

an encoding circuitry operable to encode outbound data to produce encoded data, wherein the outbound data includes an address of the first wireless station as a source address and an address of the second station as a destination address;

an interleaving circuitry operable to interleave the encoded data to produce interleaved data;

a mapping circuitry operable to map the interleaved data to a constellation pattern to produce mapped data; and a domain conversion circuitry operable to convert the mapped data into an outbound symbol stream, wherein the RF section converts the symbol stream into an outbound RF signal.

17. The first wireless station of claim 16, wherein the encoding circuitry further functions to:

encode the outbound data to produce the encoded data, wherein the outbound data further includes the forward setting field that indicates to the access point to forward the outbound RF signal with the address of the first wireless station as the source address instead of with an address of the access point as the source address.

18. The first wireless station of claim 16, wherein the processing circuitry is further operable to:

generate a first acknowledgement in response to receiving the first message from the second wireless station; and generate a second acknowledgement in response to receiving the second message received from the access point, wherein the processing circuitry is in a snoop mode to receive the second message from the access point.

19. The first wireless station of claim 18, wherein the processing circuitry further functions to:

detect the first message is from the second wireless station; and when the first message is detected to be from the second wireless station, waiting for a period corresponding to inter-frame spacing to receive the second message from the access point.

20. The first wireless station of claim 12 wherein the processing circuitry is coupled to implement the soft decision circuitry.

* * * * *